(12) United States Patent
Raabe

(10) Patent No.: US 8,297,901 B2
(45) Date of Patent: Oct. 30, 2012

(54) WIRE BINDING SCREW FOR A CIRCUIT BREAKER

(75) Inventor: Rodney D. Raabe, Swisher, IA (US)

(73) Assignee: Schneider Electric USA, Inc., Palatine, IL (US)

( * ) Notice: Subject to any disclaimer, the term of this patent is extended or adjusted under 35 U.S.C. 154(b) by 303 days.

(21) Appl. No.: 12/725,805

(22) Filed: Mar. 17, 2010

(65) Prior Publication Data

US 2011/0226594 A1     Sep. 22, 2011

(51) Int. Cl.
*H01R 4/36* (2006.01)
*F16B 35/00* (2006.01)

(52) U.S. Cl. ......................................... 411/393; 439/811

(58) Field of Classification Search .................. 411/393, 411/403–405, 410; 439/811, 812
See application file for complete search history.

(56) References Cited

U.S. PATENT DOCUMENTS

| | | | | |
|---|---|---|---|---|
| 960,244 A * | 6/1910 | Allen | | 470/16 |
| 1,910,182 A * | 5/1933 | Robertson | | 411/410 |
| 2,229,565 A * | 1/1941 | Hallowell, Jr. | | 411/403 |
| 3,144,293 A * | 8/1964 | De Smidt | | 439/797 |
| 4,136,416 A * | 1/1979 | Thomas | | 470/8 |
| 4,318,156 A | 3/1982 | Gallagher | | 361/358 |
| 5,674,037 A * | 10/1997 | Lu | | 411/410 |
| 6,104,273 A | 8/2000 | Larranaga et al. | | 337/82 |
| 6,220,805 B1 * | 4/2001 | Chang | | 411/403 |
| 6,349,466 B1 * | 2/2002 | Redler et al. | | 29/825 |
| 7,883,308 B2 * | 2/2011 | Hung | | 411/393 |
| 2009/0129888 A1 * | 5/2009 | Hung | | 411/403 |

OTHER PUBLICATIONS

Craftech® Industries, Inc., Headless Set Screws: Combination Slot and Socket Catalog, www.AboveBoardElectronics.com, printed on Jan. 28, 2010 (3 pages).
Craftech® Industries, Inc., Downloadable Online Catalog of Craftech's Plastic Fasteners, http://www.craftechind.com/Cataolg-Craftech,htm, printed on Jan. 28, 2010 (4 pages).
Photographs of Wireless Binding Screw for a Circuit Breaker (Figures 1-4), Mar. 19, 2010 (4 pages).

* cited by examiner

*Primary Examiner* — Flemming Saether
(74) *Attorney, Agent, or Firm* — Nixon Peabody LLP

(57) ABSTRACT

A headless wire binding screw for use in a circuit breaker contains a slotted drive in combination with a Robertson drive. The slotted drive is for use with a slotted-type driver (such as a slotted screwdriver) and the Robertson drive is for use with a Robertson-type driver (such as a Robertson screwdriver). The screw has a body with a diameter of constant size along the entire length of the body. The screw also has an external thread that is formed along the entire length of the body.

3 Claims, 5 Drawing Sheets

WIRE BINDING SCREW FOR A CIRCUIT BREAKER

FIELD OF THE INVENTION

This invention is directed generally to circuit breakers, and, more particularly, to a headless combination drive screw for fastening a wire to a circuit breaker.

BACKGROUND OF THE INVENTION

Circuit breakers are well known and commonly used to protect automatic circuit interruption to a monitored circuit when undesired conditions occurs. For example, a circuit breaker is designed to interrupt current flowing in the monitored circuit when it detects one or more of an overload condition, a ground fault condition, or a short-circuit condition.

Typically, a circuit breaker is electrically and physically connected to a load wire via a wire connector, which includes a wire binding screw fastened to a wire connector. The typical wire binding screw is a headless screw (also known as a set screw) that has a shaped drive at one end of the screw for receiving a screwdriver tip. The screwdriver tip is inserted into the drive of the screw to rotate it relative to the wire connector. Depending on the direction of the rotation, a user can fasten or unfasten the load wire to the circuit breaker by rotating the screw.

One problem associated with present headless wire binding screws is that various drive shapes are necessary, based on regional client requirements. For example, circuit breakers sold to Canadian customers generally require a headless wire binding screw with a square-socket drive (also known as a Robertson drive) for receiving a square-shaped screwdriver (also known as a Robertson screwdriver). This requirement is mainly based on the popularity of the Robertson screwdriver in Canada. Furthermore, the Robertson screwdriver is rapidly gaining popularity in the United States.

In contrast, for example, circuit breakers sold to American customers generally require a wire binding screw with a slotted drive for receiving a flatblade screwdriver. This requirement is mainly based on the popularity of the flatblade screwdriver in the United States of America. Accordingly, the same type of circuit breaker may require packaging and/or assembly that either includes various optional headless wire binding screws (e.g., includes both a headless wire binding screw with a Robertson drive and a headless wire binding screw with a slot drive) or that is limited to a specific region (e.g., a circuit breaker having a headless wire binding screw with a Robertson drive is sold only in Canada).

Another type of wire binding screw provided by some manufacturers is a screw with a head that has a slot and Robertson combination drive (also referred to as a headed combination drive screw). The headed combination drive screw is manufactured using conventional cold heading production equipment. The underside of the head allows the equipment to support a screw blank while the combination drive (e.g., slot and Robertson drive) is formed in the screw blank. However, in contrast to the headed screw, a headless screw does not have the underside of the head for providing support to the combination drive when rolling the thread on the screw blank. Slots in slotted headless screws are saw cut after threading. In contrast, in the cold heading process the drive configuration is stamped into the blank before rolling the thread on the screw blank. Accordingly, when the thread is rolled on the screw blank using current manufacturing methods and materials (e.g., cold forming using carbon steel AISI 1010), the combination drive will close up such that the drive tool (e.g., screwdriver) cannot enter the combination drive.

The regional demands for a particular shaped drive in a headless wire binding screw causes inefficiencies related to manufacturing, assembly, and/or marketing of present circuit breakers. For example, based on requirements specific to a particular region, a manufacturer would have to consider expenses associated with two separate circuit breaker assemblies in which the only difference may be the type of the headless wire binding screw that is being provided (e.g., having either a Robertson drive or a flatblade drive).

What is needed, therefore, is a wire binding screw having a slotted-square drive screw for a circuit breaker that addresses the above-stated and other problems.

SUMMARY OF THE INVENTION

In an implementation of the present invention, a headless wire binding screw contains a slotted drive for use with a slotted-type driver (such as a slotted screwdriver) in combination with a Robertson drive for use with a Robertson-type driver (such as a Robertson screwdriver). The combination of the slotted drive and the Robertson drive allows the use of both a slotted-type driver and a Robertson-type driver for attaching a load wire to a circuit breaker. The headless wire binding screw can be used in various types of electrical equipment, such as circuit breakers having an amperage of about 15 Amperes to about 70 Amperes.

The headless wire binding screw of the present invention provides many advantages, including usage with multiple-types of drive tools without any other design changes to the circuit breakers. For example, using a headed screw would require the redesign of present circuit breakers to accommodate the increase in dimensions caused by the head of the screw, wherein the redesign may include modifications to the housing base and/or cover, the calibration scheme, the current path, the wire connector, etc.

In turn, the modifications to the circuit breaker would require the wire connector and the circuit breaker to be completely tested and recertified. Instead, using the headless wire binding screw of the present invention eliminates all of these problems because the exterior dimensions of the wire binding screw remain generally the same. In other words, the combination of the slotted drive and the Robertson drive does not change space and clearance dimension requirements of present circuit breakers. Accordingly, special design, material, and manufacturing requirements have been adapted for cold heading and thread rolling processes to allow low cost manufacturing of the headless wire binding screw keeping the dimensions of the drive configuration within tolerance.

In another implementation of the present invention, a headless wire binding screw for a circuit breaker includes a body having a circular cross-section defined by an exterior diameter. The exterior diameter has a constant size along the entire length of the body, wherein the length of the body is defined by a top surface at a top end and a bottom surface at a bottom end. The screw further includes an internal multi-shape drive for receiving a drive tool at the top end of the body, the multi-shape drive including both a Robertson drive and an overlapping slotted drive. The Robertson drive is adapted for receiving a square socket tip of a Robertson-type driver, and the slotted drive is adapted for receiving a slotted tip of a slotted-type driver. The screw further includes an external thread formed along the entire length of the body including the top end in which the multi-shape drive is located.

In another implementation of the present invention, a method is directed to manufacturing a headless wire binding screw for a circuit breaker. The method includes providing a body having a circular cross-section defined by an exterior diameter, the exterior diameter being of a constant size along the entire length of the body. The length of the body is defined by a top surface at a top end and a bottom surface at a bottom end. The method further includes forming an internal multi-shape drive for receiving a drive tool at the top end of the body, the multi-shape drive including both an internal Robertson drive and an overlapping slotted drive. The Robertson drive is adapted for receiving a square socket tip of a Robertson-type driver, the slotted drive being adapted for receiving a slotted tip of a slotted-type driver. After the forming of the multi-shape drive, an external thread is rolled along the entire length of the body including the top end in which the multi-shape drive is located.

In another alternative implementation of the present invention, a circuit breaker includes a housing for enclosing internal components, a wire connector for receiving a lead electrical wire, and a headless wire binding screw connected to the wire connector. The screw has a body with an exterior diameter of a constant size along the entire length of the body and an internal multi-shape drive for receiving a drive tool at one end of the body. The multi-shape drive includes an internal Robertson drive centered with and overlapping a slotted drive. The screw further has an external thread formed along the entire length of the body, wherein a thread height forms the exterior diameter of the body.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

The invention may best be understood by reference to the following description taken in conjunction with the accompanying drawings.

DETAILED DESCRIPTION OF THE ILLUSTRATED EMBODIMENTS

Although the invention will be described in connection with certain preferred embodiments, it will be understood that the invention is not limited to those particular embodiments. On the contrary, the invention is intended to include all alternatives, modifications and equivalent arrangements as may be included within the spirit and scope of the invention as defined by the appended claims.

Figure 1:
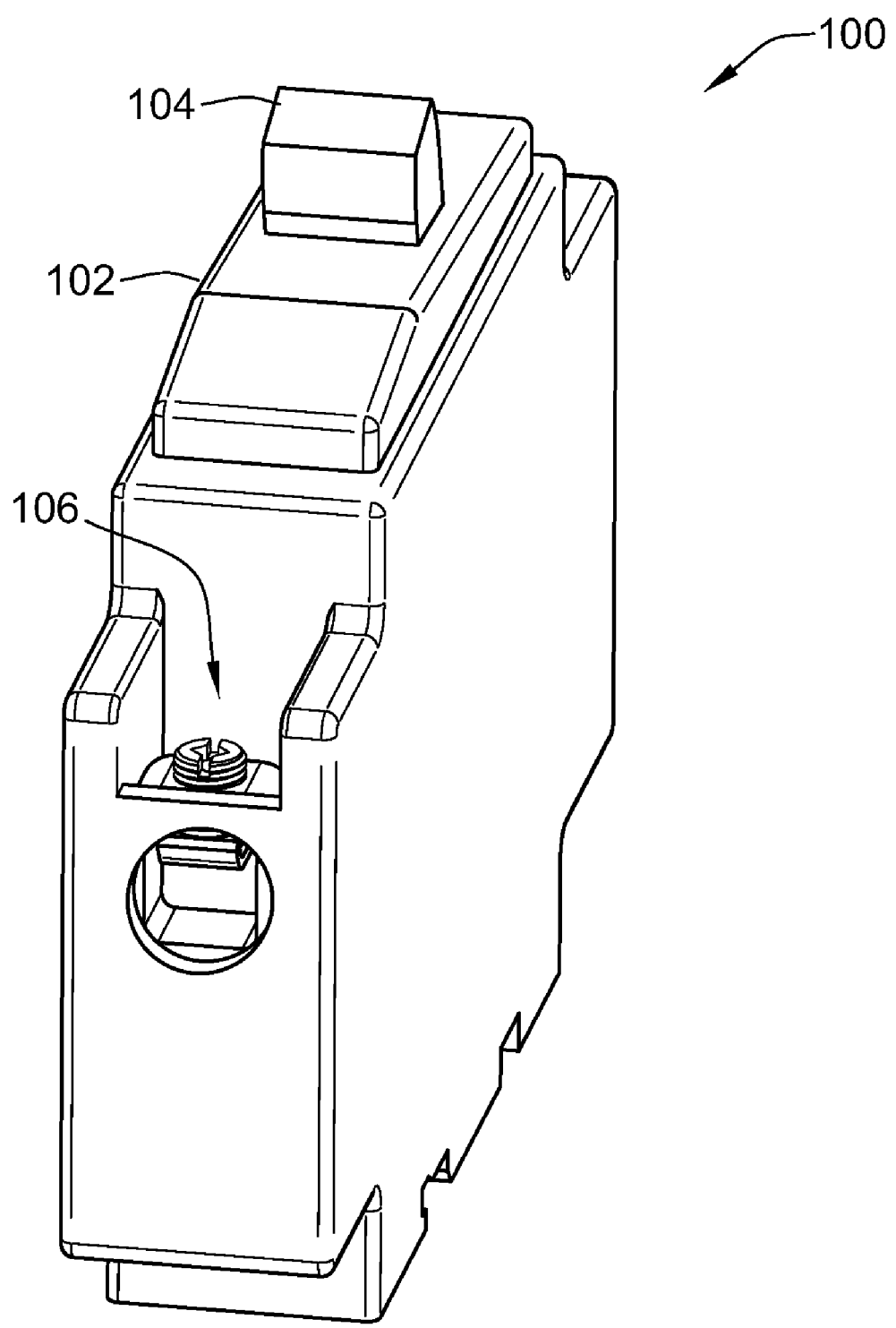
FIG. 1 is a perspective view of a circuit breaker having a wire connectors with a headless wire binding screw.

Referring to FIG. 1, a circuit breaker 100 has a housing 102 in which internal components are enclosed, a handle 104 for manually setting the circuit breaker 100 to an ON position or OFF position, and a wire connector assembly 106 for attaching a load wire to the circuit breaker 100. Although the circuit breaker 100 is shown and described as a single-pole breaker, the circuit breaker 100 can also be a multi-pole breaker. Examples of the circuit breaker 100 include miniature circuit breakers and circuit breakers having amperage requirements of about 15 Amperes to about 70 Amperes.

Figure 2A:
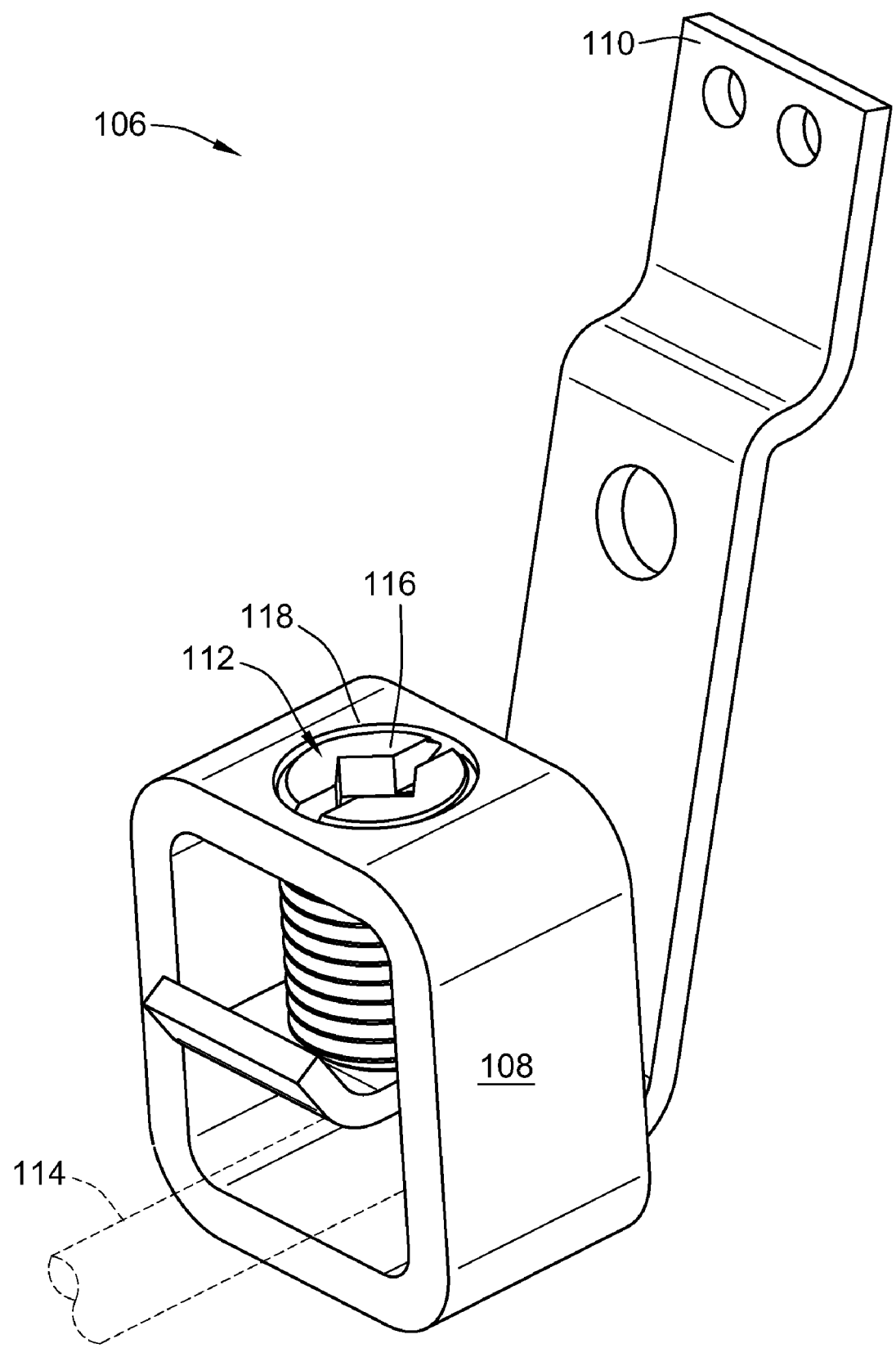
FIG. 2A is a perspective view of a wire connector assembly.
Figure 2B:
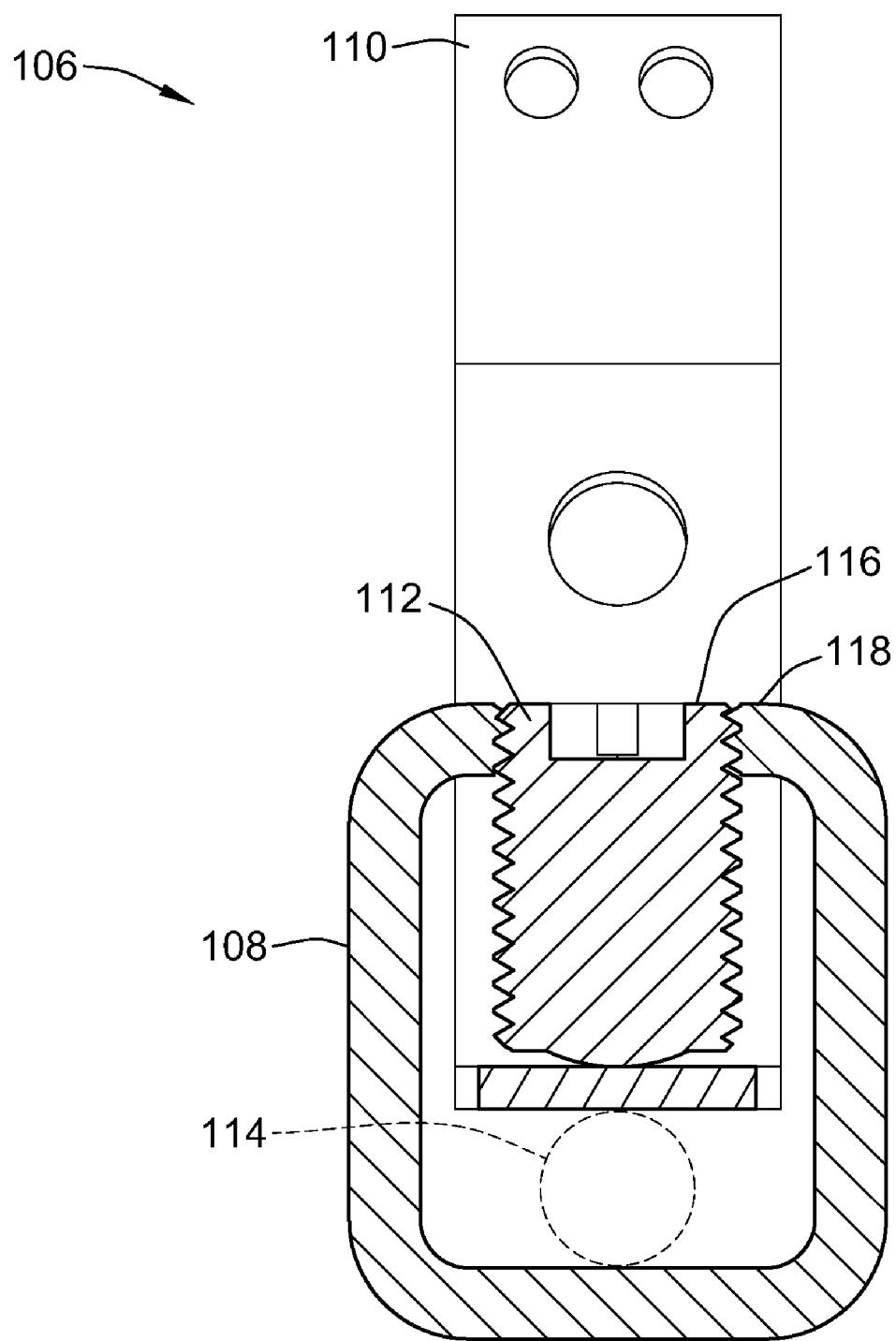
FIG. 2B is a front cross-sectional view of the wire connector assembly of FIG. 2A.

Referring to FIGS. 2A and 2B, the wire connector assembly 106 includes a wire connector 108, a lead terminal 110, and a headless wire binding screw 112. The wire binding screw 112 is fastened to the wire connector 108 to secure a load wire 114 (in phantom) to the circuit breaker 100. In distinction to a headed screw, a top surface 116 of the present wire binding screw 112 is generally aligned with a top surface 118 of the wire connector 108 when the wire binding screw 112 is completely inserted into the wire connector 108. The alignment of the top end 116 with the top surface 118 is a beneficial feature that helps eliminate or reduce potential interference between the wire binding screw 112 and other components.

Figure 3A:
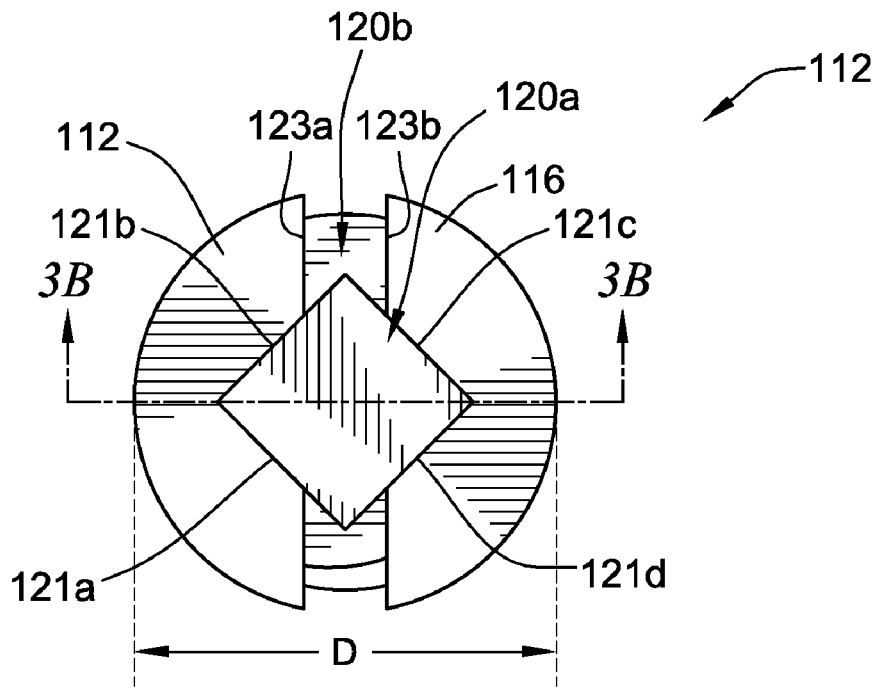
FIG. 3A is a top view of the headless wire binding screw.
Figure 3B:
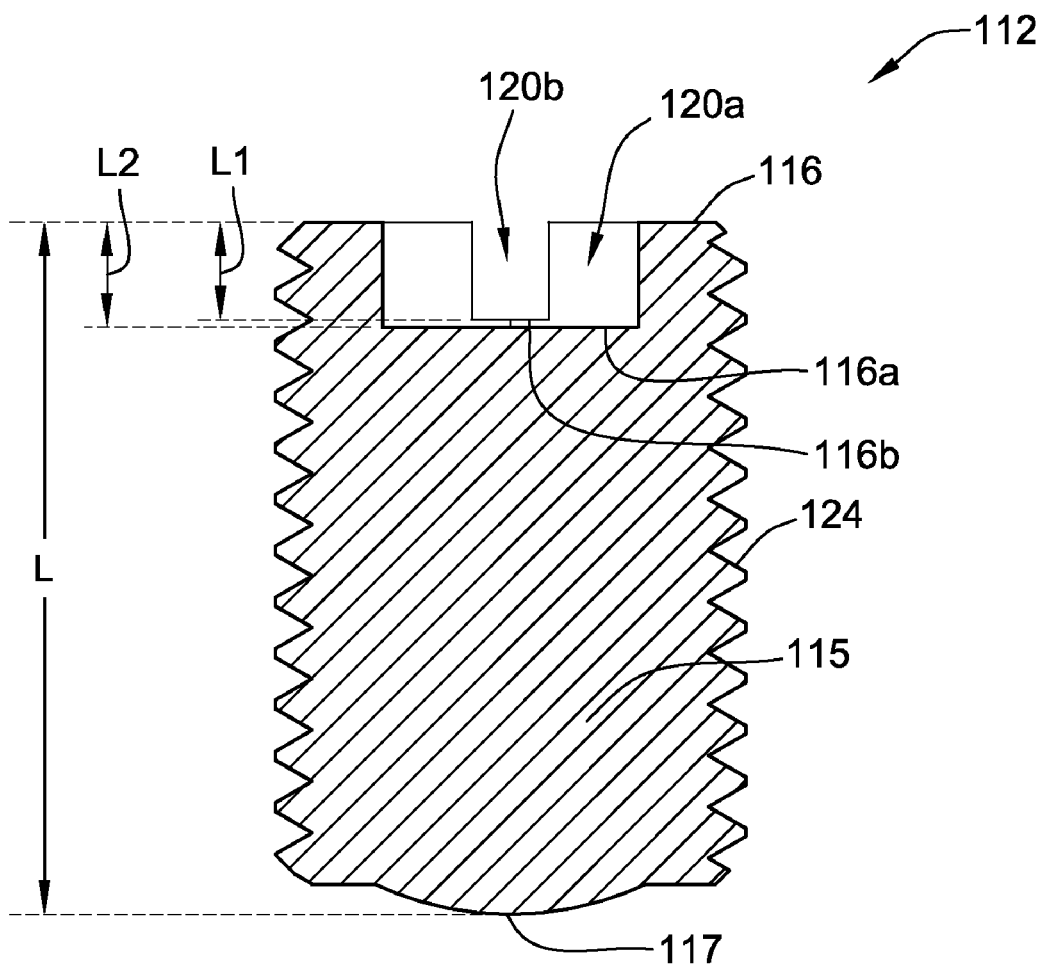
FIG. 3B is a side cross-sectional view of the headless wire binding screw.

Referring to FIGS. 3A and 3B, the headless wire binding screw 112 has a body 115, the top surface 116 at a top end, and a bottom surface 117 at a bottom end. The body 115 has a length L and extends between the top surface 116 and the bottom surface 117. The body 115 also has a generally circular cross-section defined by an exterior diameter D that has a constant size along the entire length L of the body 115.

The headless wire binding screw 112 also has an internal multi-shape drive (or combination drive) for receiving a drive tool. The multi-shape drive is a combination of a square-socket drive 120a (also referred to as a Robertson drive) and an overlapping slotted drive 120b that is preferably stamped unto a screw blank formed via a cold heading manufacturing process. The disclosed design, material, and manufacturing features of the headless wire binding screw 112 have been adapted for cold heading and thread rolling processes to allow low cost manufacturing that maintains dimensions of the combination drive configuration within predetermined tolerance limits.

The Robertson drive 120a is adapted for receiving a square socket tip of a Robertson-type driver. For example, the Robertson-type driver can be a Robertson screwdriver (also known as a square drive screwdriver) that has a square-shaped tip with a slight taper. Robertson screws (and screwdrivers) are commonly used in Canada, and are advantageous because they are generally self-centering, they can be removed after extended periods of time, they can reduce product damage, and they are generally easy to manufacture until one tries to manufacture a combination drive in a headless screw dimensioned for use in a household circuit breaker.

The Robertson drive 120a is generally a square-shaped internal pocket that is formed completely within the periphery of the exterior diameter D of the body 115. As shown, the Robertson drive 120a has four generally orthogonal sides 121a-121d that are each oriented at about a 45° angle relative to one of the two parallel walls 123a, 123b of the slotted drive 120b. One advantage of this orientation is that it maximizes the overall material between the periphery of the Robertson drive 120a and the exterior diameter D of the body 115. However, the Robertson drive 120a can have other orientations relative to the body 115 and/or the slotted drive 120b, e.g., parallel or random orientations.

Figure 4:
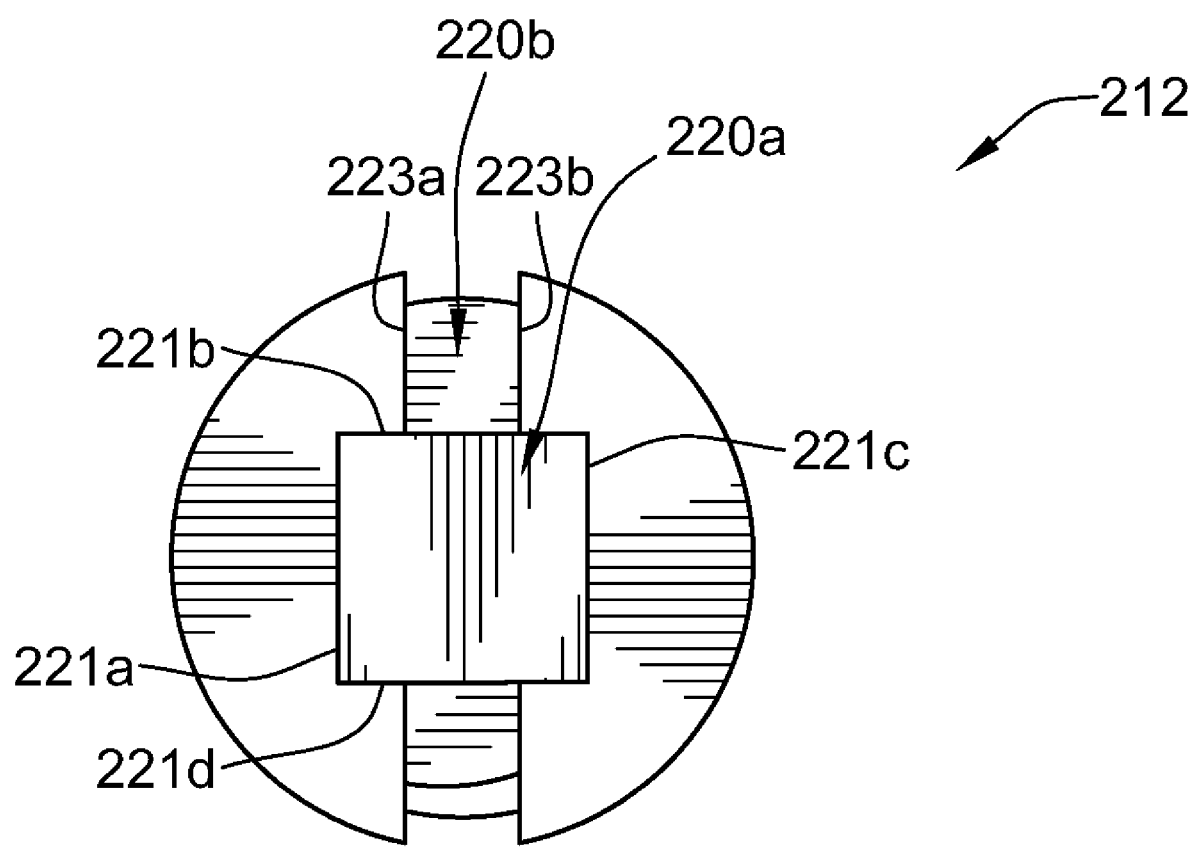
FIG. 4 is a top view of an alternative embodiment of a headless wire binding screw.

For example, as shown in FIG. 4, according to an alternative embodiment a headless wire binding screw 212 has an internal multi-shape drive in which a Robertson drive 220a is oriented such that two of its sides 221a, 221c are generally parallel to parallel walls 223a, 223b of a slotted drive 220b (wherein the other two sides 221b, 221d are generally perpendicular to the parallel walls 223a, 223b). One advantage of this alternative orientation is directed to ease of manufacturing in positioning the Robertson drive 220a and the slotted drive 220b relative to each other.

The Robertson drive 120a extends along a distance L2 internally within the body, from the top surface 116 to an internal socket surface 116a. The slotted drive 120b also extends internally within the body, along a distance L1, from the top surface 116 to an internal slotted surface 116b. As shown, distance L2 is greater than distance L1. The greater distance L1 provides enhanced driving capability for a Robertson driver, wherein the Robertson driver can more firmly capture and rotate the headless wire binding screw 112 via the Robertson drive 120a.

The slotted drive 120b is adapted for receiving a flat head tip of a slotted-type driver. For example, the slotted-type driver can be a typical flatblade screwdriver or flatblade power tool. The slotted drive 120b is generally a straight groove having the two parallel walls 123a, 123b and the internal slotted surface 116b. The two parallel walls 123a, 123b are separated by a gap throughout the entire area of the top surface 116, including along the periphery.

A thread 124 is rolled along the entire length L of the body 115, including the top end in which the multi-drive shape is located. The thread 124 is rolled to the body 115 after the Robertson drive 120a and the slotted drive 120b are formed in the body 115.

One advantage of the disclosed combination drive is that dimensions of the headless wire binding screw 112 are maintained within predetermined tolerance limits. For example, the length L and exterior diameter D of the body 115 remain the same independent of the combination drive. As such, space allocated in the housing 102 of the circuit breaker 100 for receiving the headless wire binding screw 112 does not require any modifications whether or not the combination drive is formed in the headless wire binding screw 112. Accordingly, the headless wire binding screw 112 can be retrofitted into current circuit breaker designs without making any modifications to the housing of the respective circuit breakers.

The headless wire binding screw 112 can be made from various materials, such as steel. For example, in contrast to typically used materials (such as carbon steel AISI 1010), carbon steel AISI 1035 is an advantageous material because it has a relatively high carbon content, it can be hardened, and it costs relatively the same. The higher carbon content imparts higher strength and hardening properties that are helpful in preventing closure of the multi-shape drive when rolling the thread unto the screw.

Thus, one advantage to carbon steel AISI 1035 (or other materials having similar properties) is that it provides strength to the headless wire binding screw 112, especially in the top end area where the multi-shape drive is located. For example, a weaker material (such as carbon steel AISI 1010) would make manufacturing difficult because the thread rolling process would tend to close the Robertson drive 120a and the slotted drive 120b (based on inherently having less and weaker material in that general area). As such, the weaker material would make it difficult to control the dimensions of both the Robertson drive 120a and the slotted drive 120b. In contrast, using a material such as carbon steel AISI 1035 helps eliminate or greatly reduce such problems.

While particular embodiments, aspects, and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A circuit breaker comprising:
    a circuit breaker housing for enclosing internal components;
    a wire connector for receiving a lead electrical wire, the wire connector having a top side defined by a thickness between a top surface and a bottom surface, the top side including a threaded hole between the top surface and the bottom surface; and
    a headless wire binding screw connected to the wire connector and having
        a body with an exterior crest diameter of a constant size along the entire length of the body, the body having a top end with a top surface being flush with the top surface of the top side of the wire connector,
        an internal multi-shape drive for receiving a drive tool at one end of the body, the multi-shape drive including an internal Robertson drive centered with and overlapping a slotted drive, the slotted drive having two parallel walls extending to the crest diameter and forming two directly-opposite openings along the crest diameter, and
        an external thread formed along the entire length of the body, wherein a thread height forms the crest diameter of the body, the external thread being contiguous at a top end of the body along the crest diameter except for the two directly-opposite openings of the slotted drive,
    wherein the binding screw is secured to the wire connector only by a portion of the external thread that is located between (a) the top surface of the top side of the wire connector and (b) the bottom surface of the top side of the wire connector.

2. The circuit breaker of claim 1, wherein the Robertson drive is oriented relative to the slotted drive such that two parallel sides of the Robertson drive are perpendicular to the slotted drive.

3. The circuit breaker of claim 1, wherein the wire binding screw is made from carbon steel AISI 1035.

* * * * *